(No Model.)
J. A. EDMONDS.
TRICYCLE.
No. 264,674. Patented Sept. 19, 1882.
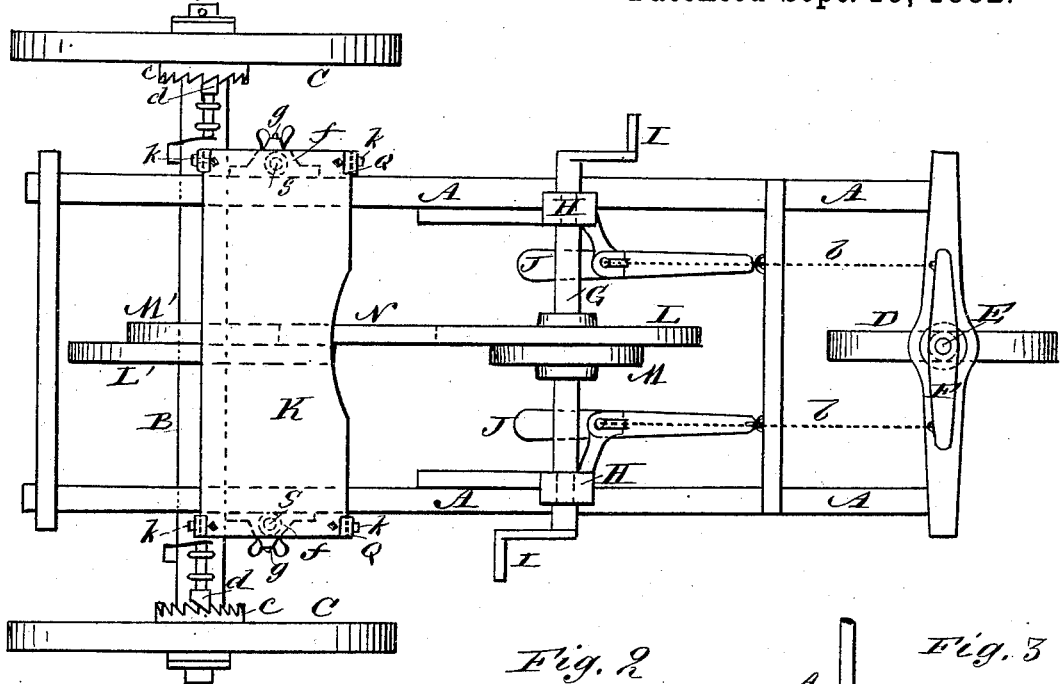
Fig. 2. Fig. 3.
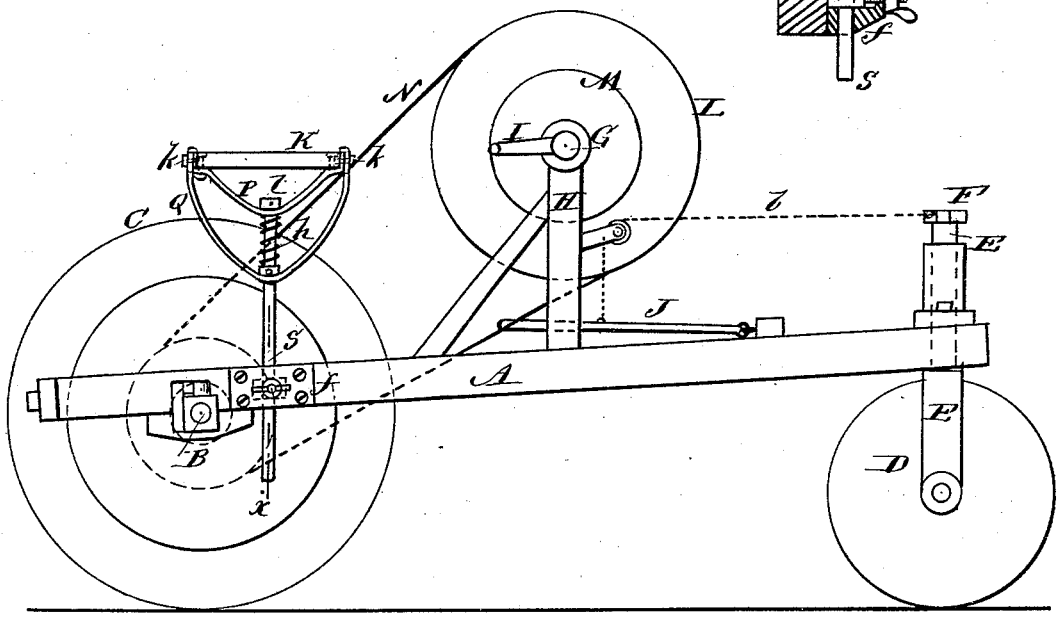
WITNESSES:
C. Neveux
C. Sedgwick
INVENTOR:
J. A. Edmonds
BY Munn & Co.
ATTORNEYS.

UNITED STATES PATENT OFFICE.

JOHN A. EDMONDS, OF CAMDEN, DELAWARE.

TRICYCLE.

SPECIFICATION forming part of Letters Patent No. 264,674, dated September 19, 1882.

Application filed February 15, 1882. (No model.)

*To all whom it may concern:*

Be it known that I, JOHN AUGUSTUS EDMONDS, of Camden, in the county of Kent and State of Delaware, have invented certain new and useful Improvements in Tricycles and other Vehicles, of which the following is a full, clear, and exact description.

Reference is to be had to the accompanying drawings, forming a part of this specification, in which similar letters of reference indicate corresponding parts in all the figures.

Figure 1 is a plan of a tricycle having my invention applied. Fig. 2 is a side elevation of the same with one of the driving-wheels removed; and Fig. 3 is a vertical section, upon a larger scale on the line $x$ $x$ in Fig. 2, of a portion of the framing with one of the spring-supports of the seat attached and means for adjusting it.

This invention relates in part to tricyles and other vehicles designed to be propelled by hand or feet; and it consists in a loose arrangement of the driving-wheels on their axle, in combination with pawl and ratchet-wheel connections to provide for either separate or joint rotation of said wheels on opposite sides of the vehicle.

The invention also consists in a combination, with the driving-axle of the vehicle and a hand-crank or operating-shaft, of pulleys and an endless chain or belt for transmitting motion from the operating-shaft to the driving-axle, said pulleys preferably being of different dimensions, whereby varying velocities may be given to the driving-wheels without changing the speed of the prime mover.

It likewise consists in a combination, with the hand-crank or operating-shaft of the vehicle and with the steering devices, of treadles for operating said devices.

Furthermore, the invention consists in a novel construction of the seat of a tricycle or other vehicle, and in certain combinations connected therewith, whereby provision is made for the elastic self-adjustment of the seat in various directions, and whereby the seat may be raised or lowered, as desired.

A in the drawings indicates the frame of a tricycle, B its main axle, and C C its driving-wheels.

D is the third or steering wheel of the vehicle; E, its post, and F the lever by which said post is manipulated to control the steering-wheel.

G is the operating-shaft of the vehicle, mounted in standards H H on the frame A, and provided with end cranks, I I, for rotating it by hand.

K is the seat on which the rider sits. Said seat is arranged immediately in rear of the operating-shaft G, and in a suitable position for its occupant to work the shaft G by its hand-cranks I I, while his feet are employed in steering the vehicle by means of treadles J J, connected with opposite ends of the lever F on the steering-post by rods, chains, or other suitable connections, $b$ $b$.

On the operating-shaft G are pulleys L M of different diameters, and on the main axle B are corresponding but reversely-arranged pulleys of different diameters, L' M'. Instead of these several pulleys of different diameters, reversely-arranged cone-pulleys may be used. Connecting the shaft G and axle B by means of these pulleys is a belt or chain, N, by which motion is imparted from the hand crank-shaft G to the axle B to propel the machine. Accordingly as said chain N is arranged to run upon and connect the pulleys L M' or L' M will the speed of the machine be made fast or slow without changing the velocity of the prime mover or shaft G.

The driving-wheels C C are fitted loosely upon the axle B, and are connected therewith by ratchet-wheels or collars $c$ $c$ on the wheels C C, and spring pawls or catches $d$ $d$ connected with the axle, whereby said wheels, when running round curves, are free to rotate independently of each other; but at other times, or in a general way, rotate in concert on opposite sides of the vehicle.

The seat K is carried by spring standards or supports S S, made of steel, and which are adjustable up or down within or through boxes $f$ $f$, attached to the sides of the frame A of the vehicle, and provided with screw-clamps $g$, of any suitable construction, for holding the standards, with their attached seat, at any height to which they may have been adjusted. In this way the seat may not only be raised or lowered to suit persons of different heights or length of limb, but is thus adjustable by elastic standards, which admit of both the lateral and transverse elastic movement of the seat. The spring-standards S S, however, do not directly support the seat, but indirectly by means of springs $h$, arranged around the standards and resting at their lower ends on collars thereon, and bearing at their upper ends against inner braces, P, secured to the seat, thus providing for an easy up-and-down motion of the seat. These inner braces, P, which are arranged below the seat and are firmly bolted thereto, are constructed with turned-up outer ends, which serve to clip or receive in between them the front and back edge portions of the seat. Outside of these braces P, and extending below them, are outer braces, Q, through which the spring-standards S S pass freely, and which contain within them, or between them and the inner braces, P P, the springs $h$. These outer braces, Q Q, are constructed to receive the turned-up ends of the inner braces, P P, within them, and are secured thereto by bolts $k\ k$, arranged to pass through their upper portions into the turned-up ends of the inner braces, and, if necessary, into the front and back edge portions of the seat. These bolts $k\ k$ form pivots for the lateral movement of the seat as provided for by the spring-standards S S, the upper ends of which are provided with heads $l$, that act as stops to prevent the seat from being unduly forced or drawn upward.

Having thus described my invention, I claim as new and desire to secure by Letters Patent—

1. In a velocipede, the combination, with the frame A, the main axle B, provided with the pulley L' M, the drive-wheels C, and the steering-wheel D, of the standards H, secured to the side bars of the frame, the shaft G, journaled in the upper ends of the said standards, and provided with the cranks I and the pulleys L M, the belt N, and means for operating the steering-wheel, substantially as herein shown and described.

2. In a velocipede, the combination, with the steering-wheel D, the post E, and the lever F on the upper end of the said post, of the treadles J J and the rods or chains $b$, substantially as herein shown and described, whereby the said steering-wheel is controlled by the feet of the rider, as set forth.

3. In a velocipede, the combination, with the frame A, of the seat supporting spring-standards G, the boxes $f$, and the screw-clamp $g$, substantially as herein shown and described, whereby the seat can be raised or lowered, as set forth.

4. The combination, with the spring-standards S S of the seat K, of the inner braces, P P, bolted to the seat, the outer braces, Q Q, secured by bolts or pivots $k\ k$ to the front and back sides or edges of the seat, and constructed to receive the standards S S freely through them, and the springs $h\ h$, arranged between said braces P Q, and made to rest or bear upon a collar or projection on the standards, whereby provision is made for the elastic adjustment of the seat in various directions, substantially as herein described.

JOHN A. EDMONDS.

Witnesses:
C. SEDGWICK,
A. GREGORY.